United States Patent
Takahashi et al.

(10) Patent No.: US 10,737,642 B2
(45) Date of Patent: Aug. 11, 2020

(54) PROTECTOR

(71) Applicants: YAZAKI CORPORATION, Tokyo (JP); TOYOTA JIDOSHA KYUSHU KABUSHIKI KAISHA, Miyawaka-shi, Fukuoka-ken (JP); TOYOTA JIDOSHA KABUSHIKI KAISHA, Toyota-shi, Aichi-ken (JP)

(72) Inventors: Kazuya Takahashi, Toyota (JP); Yoshimichi Yamao, Toyota (JP); Yusuke Nakachi, Miyawaka (JP); Toru Hatae, Miyawaka (JP); Yasuaki Murao, Miyawaka (JP)

(73) Assignees: YAZAKI CORPORATION, Minato-ku, Tokyo (JP); TOYOTA JIDOSHA KYUSHU KABUSHIKI KAISHA, Miyawaka-shi, Fukuoka-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/117,728

(22) Filed: Aug. 30, 2018

(65) Prior Publication Data
US 2019/0061651 A1  Feb. 28, 2019

(30) Foreign Application Priority Data
Aug. 31, 2017 (JP) .................................. 2017-167099

(51) Int. Cl.
*B60R 16/02* (2006.01)
*H02G 3/04* (2006.01)
*H02G 3/32* (2006.01)

(52) U.S. Cl.
CPC ....... *B60R 16/0215* (2013.01); *H02G 3/0487* (2013.01); *H02G 3/0418* (2013.01); *H02G 3/32* (2013.01)

(58) Field of Classification Search
CPC .............. B60R 16/0215; H01B 7/0045; H02G 3/0418; H02G 3/0437; H02G 3/0487; H02G 3/32
See application file for complete search history.

(56) References Cited

U.S. PATENT DOCUMENTS 5,444,182 A * 8/1995 Hoshino .............. H01R 13/506
  174/72 A
6,211,465 B1 * 4/2001 Streit ................... H02G 3/0691
  16/2.1
(Continued)

FOREIGN PATENT DOCUMENTS

JP    63-173864 U    11/1988
JP     7-27231 U     5/1995
(Continued)

*Primary Examiner* — William H. Mayo, III
*Assistant Examiner* — Rhadames Alonzo Miller
(74) *Attorney, Agent, or Firm* — Sughrue Mion, PLLC

(57) ABSTRACT

A protector includes: a main body part including an accommodation part which accommodates an electric wire bundle; a cover part which is attached to the main body part and covers the accommodation part; and a clamp which is formed on the main body part and is inserted into a locking hole formed in a mounting target part to lock the mounting target part. The protector further includes a pressing piece which is formed on a side of the main body part opposite to the clamp, extends along a plane perpendicular to an axis of the clamp, and is disposed at a position laterally deviating from the axis of the clamp.

9 Claims, 13 Drawing Sheets

(56) References Cited

U.S. PATENT DOCUMENTS

| | | | | |
|---|---|---|---|---|
| 6,368,009 B1* | 4/2002 | Noda | ............... | B60J 3/023 403/329 |
| 6,875,918 B2* | 4/2005 | Sudo | ............... | H02G 3/0468 138/108 |
| 7,484,534 B2* | 2/2009 | Schmidt | ............... | F16L 9/22 138/106 |
| 7,581,564 B2* | 9/2009 | Tanaka | ............... | F16L 21/06 138/110 |
| 7,591,286 B2* | 9/2009 | Howard | ............... | H02G 9/065 138/108 |
| 8,070,212 B2* | 12/2011 | Shima | ............... | B60R 16/0207 296/146.9 |
| 8,124,887 B2* | 2/2012 | Suzuki | ............... | B60R 16/0215 174/481 |
| 8,847,073 B2* | 9/2014 | Tokunaga | ............... | B60R 16/0215 174/68.1 |
| 9,698,522 B2* | 7/2017 | Markefka | ............... | H01R 13/5804 |
| 2002/0061676 A1* | 5/2002 | Kameyama | ............... | H01R 4/2429 439/404 |
| 2003/0181093 A1* | 9/2003 | Negishi | ............... | H01R 4/2433 439/404 |
| 2003/0213607 A1* | 11/2003 | Katsumata | ............... | H02G 3/0487 174/68.3 |
| 2003/0222183 A1* | 12/2003 | Kato | ............... | B60R 16/0215 248/49 |
| 2004/0163230 A1* | 8/2004 | Nakamura | ............... | B25B 27/28 29/464 |
| 2004/0182973 A1* | 9/2004 | Kawai | ............... | F16L 3/1075 248/71 |
| 2005/0217888 A1* | 10/2005 | Arai | ............... | H02G 3/0418 174/72 A |
| 2005/0260874 A1* | 11/2005 | Murakami | ............... | H01R 4/2433 439/142 |
| 2006/0090916 A1* | 5/2006 | Suzuki | ............... | H02G 3/0691 174/481 |
| 2007/0128929 A1* | 6/2007 | Oga | ............... | F16L 3/1025 439/578 |
| 2007/0272807 A1* | 11/2007 | Takagaki | ............... | F16B 21/086 248/71 |
| 2008/0023223 A1* | 1/2008 | Suzuki | ............... | H02G 3/0481 174/72 A |
| 2009/0017653 A1* | 1/2009 | Shimizu | ............... | H02G 3/081 439/95 |
| 2009/0042444 A1* | 2/2009 | Shimizu | ............... | H01R 4/185 439/620.21 |
| 2009/0167461 A1* | 7/2009 | Oiwa | ............... | B60R 16/0207 333/181 |
| 2009/0211781 A1* | 8/2009 | Suzuki | ............... | B60R 16/0215 174/101 |
| 2013/0075155 A1* | 3/2013 | Kawai | ............... | B60R 16/0215 174/70 C |
| 2013/0126233 A1* | 5/2013 | Nagayasu | ............... | B60R 16/0215 174/72 A |
| 2014/0124261 A1* | 5/2014 | Mizuhira | ............... | B60R 16/0215 174/74 R |
| 2015/0305174 A1* | 10/2015 | Yoshimura | ............... | B60R 16/0222 174/668 |
| 2015/0343968 A1* | 12/2015 | Nagayasu | ............... | B60R 16/0215 248/68.1 |
| 2016/0020000 A1* | 1/2016 | Doushita | ............... | F16B 21/086 174/72 A |

FOREIGN PATENT DOCUMENTS

| | | |
|---|---|---|
| JP | 8-168134 A | 6/1996 |
| JP | 2001-112140 A | 4/2001 |
| JP | 2004-64919 A | 2/2004 |
| JP | 2007-295721 A | 11/2007 |

* cited by examiner

PROTECTOR

CROSS-REFERENCES TO RELATED APPLICATIONS

This application is based on and claims priority from Japanese Patent Application No. 2017-167099 filed on Aug. 31, 2017, the entire contents of which are incorporated herein by reference.

FIELD

One or more embodiments of the present invention relate to a protector which is mounted on an electric wire bundle of a wire harness.

BACKGROUND

For example, as illustrated in FIG. 13, as a protector 101 mounted on an electric wire bundle 100 of a wire harness, the protector equipped with a clamp 104 for locking a bracket 102 of a vehicle body is known (see, for example, JP-U-S63-173864, JP-A-H08-168134, and JP-A-2004-064919). The protector 101 is assembled to the bracket 102 by pressing a surface 105 opposite to the clamp 104 with the finger by the operator to insert the clamp 104 into a locking hole 103 of the bracket 102. As the surface 105 to be pressed at the time of assembly, for example, a plane with each side of about 10 mm is necessary.

SUMMARY

Since the vehicle body to which the protector 101 is assembled has a complicated shape, when assembling the protector 101 to a narrow place of the vehicle body, there is a case where an insufficient space for workers to put their fingers is not secured on the rear side in an insertion direction of the clamp 104 into the locking hole 103 of the bracket 102. In this case, it is not possible to put a hand on the opposite side of the protector 101 from the clamp 104, and it is difficult to perform an assembling work of pushing the protector 101 from the opposite side to the clamp 104 and inserting the clamp 104 into the locking hole 103. Therefore, in such a case, a fixed position and a fixed structure with respect to the bracket 102 had to be changed.

One or more embodiments of the invention have been made in view of the above-described circumstances, and an object thereof is to provide a protector which can be easily assembled to a mounting target part even in a narrow installation space.

In order to achieve the above-described object, one or more embodiments of the invention provides the protector according to the following (1) to (5).

(1) A protector including:
a main body part including an accommodation part which accommodates an electric wire bundle;
a cover part which is attached to the main body part and covers the accommodation part;
a clamp which is formed on the main body part and is inserted into a locking hole formed in a mounting target part to lock the mounting target part; and
a pressing piece which is formed on a side of the main body part opposite to the clamp, extends along a plane perpendicular to an axis of the clamp, and is disposed at a position laterally deviating from the axis of the clamp.

(2) The protector according to (1),
wherein the main body part has a mounting hole and includes a fixing plate part fastened to the mounting target part by a bolt inserted into the mounting hole, and
wherein the axis of the clamp is arranged around the axis of the mounting hole.

(3) The protector according to (1) or (2),
wherein the pressing piece is arranged in parallel with the plane perpendicular to the axis of the clamp.

(4) The protector according to (1) or (2),
wherein the pressing piece is inclined toward the clamp as it is farther from the axis of the clamp with respect to the plane perpendicular to the axis of the clamp.

(5) The protector according to (1) or (2),
wherein the pressing piece is inclined toward a side opposite to the clamp as it is farther from the axis of the clamp with respect to the plane perpendicular to the axis of the clamp.

According to the protector having the configuration (1), on the side in the main body part opposite to the clamp, a pressing piece, which extends along the plane perpendicular to an axis of the clamp and is disposed at a position laterally deviating from the axis of the clamp, is formed. Therefore, the pressing piece is pushed at a position laterally deviating from the axis of the clamp, and the clamp can be pushed into and locked to the locking hole formed in the bracket of the vehicle body which is the mounting part. Therefore, even when assembling the clamp to the mounting target part, even in the case of assembling the clamp to the narrow installation space in which it is not possible to secure the space for putting the finger on the side opposite to the clamp, it is possible to lock the clamp to the locking hole and to easily assemble the clamp to the mounting target part.

According to the protector having the configuration (2), by pressing the pressing piece temporarily fixed to the vehicle body by a bolt inserted into a mounting hole of a fixing plate part, the clamp can be easily inserted and locked to the locking hole with the provisionally fixed portion provided by the bolt as a fulcrum. As a result, it is possible to reduce the pressing force required when pushing the clamp into the locking hole, and it is possible to improve the assembling workability.

According to the protector having the configuration (3), the pressing force when the pressing piece is pressed can be stably applied to the clamp and the clamp can be smoothly pushed into the locking hole and locked thereto.

According to the protector having the configuration (4), the space in the pressing piece on the side opposite to the clamp can be enlarged, and the assembling workability can be improved.

According to the protector having the configuration (5), it is possible to improve the catching of the finger when pressing the pressing piece, the pressing piece can be pushed with a stronger force and the clamp can be reliably pushed into the locking hole and locked thereto.

According to one or more embodiments of the invention, it is possible to provide a protector that can be easily assembled to a mounting target part even in a narrow installation space.

One or more embodiments of the invention has been briefly described above. Furthermore, the details of one or more embodiments of the invention will be further clarified by the embodiment described below with reference to the attached drawings.

DETAILED DESCRIPTION

Hereinafter, an embodiment of the invention will be described with reference to the drawings.

Figure 1:
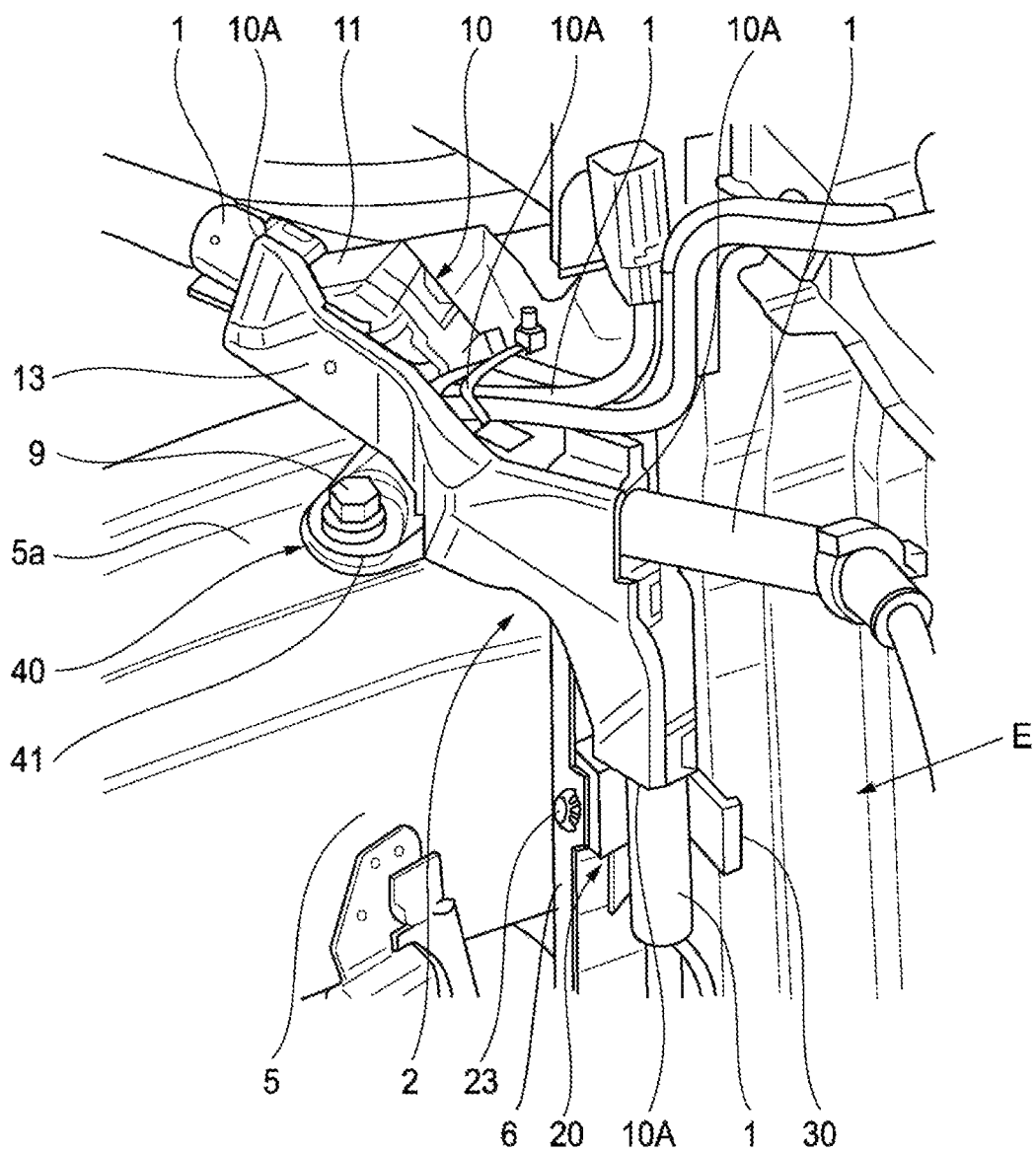
FIG. 1 is a perspective view illustrating a state in which a protector according to the present embodiment is fixed to a vehicle body.
Figure 2:
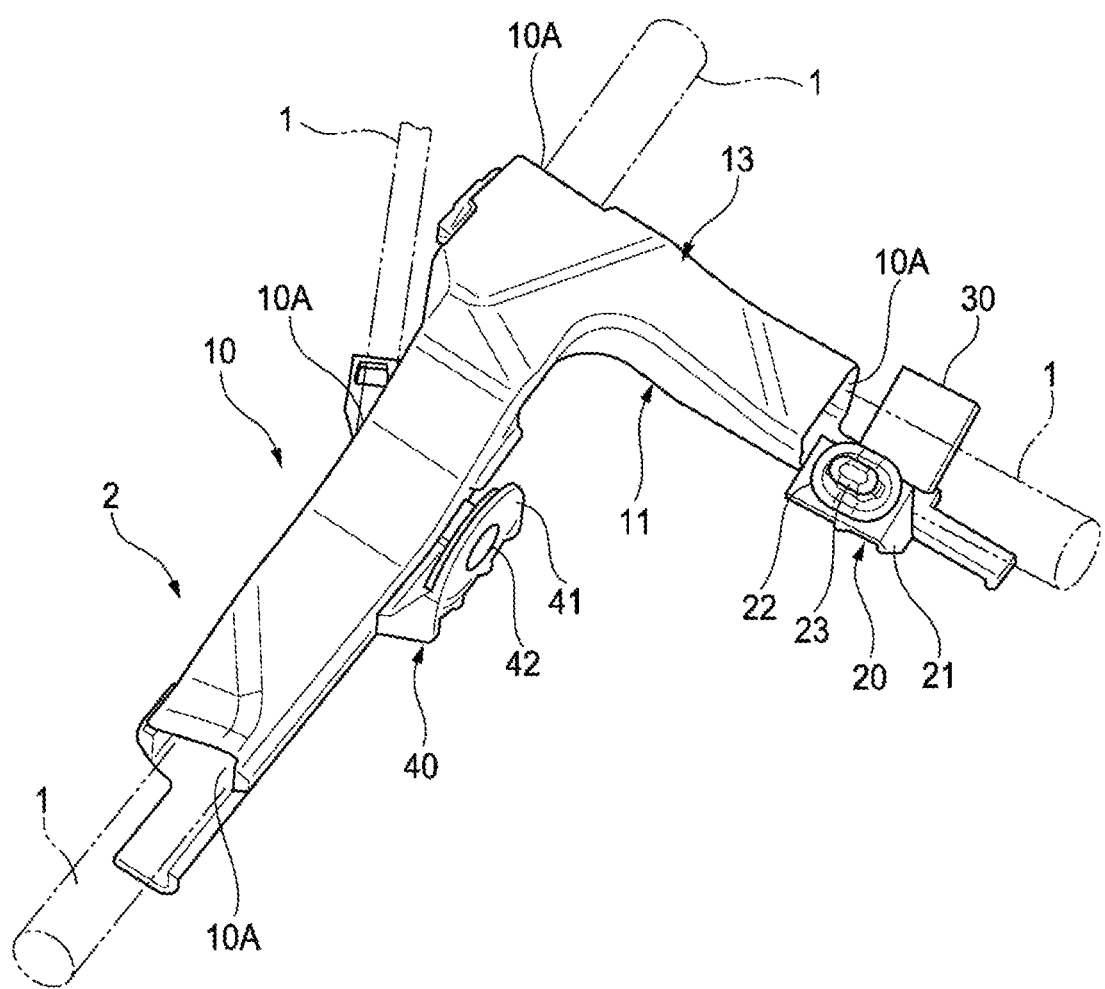
FIG. 2 is a perspective view of the protector according to the embodiment.

FIG. 1 is a perspective view of a state in which a protector according to the embodiment is fixed to a vehicle body. FIG. 2 is a perspective view of the protector according to the embodiment.

As illustrated in FIGS. 1 and 2, the protector 10 according to the embodiment is assembled to an electric wire bundle 1 in which plural electric wires are bundled to constitute a wire harness 2. The protector 10 includes electric wire lead-out parts 10A at plural positions, and the electric wire bundle 1 are drawn out from these electric wire lead-out parts 10A. The protector 10 is fixed to the vehicle body 5 which is an attachment part, and thus, the wire harness 2 is arranged along the surface of the vehicle body 5. In the periphery of the vehicle body 5, peripheral components such as an engine and a motor are disposed. The electric wire bundle 1 drawn out from the electric wire lead-out part 10A of the protector 10 are protected by an exterior member such as a corrugated tube or the like wound around the outer circumference or a tape mounted on the outer circumference.

Figure 3:
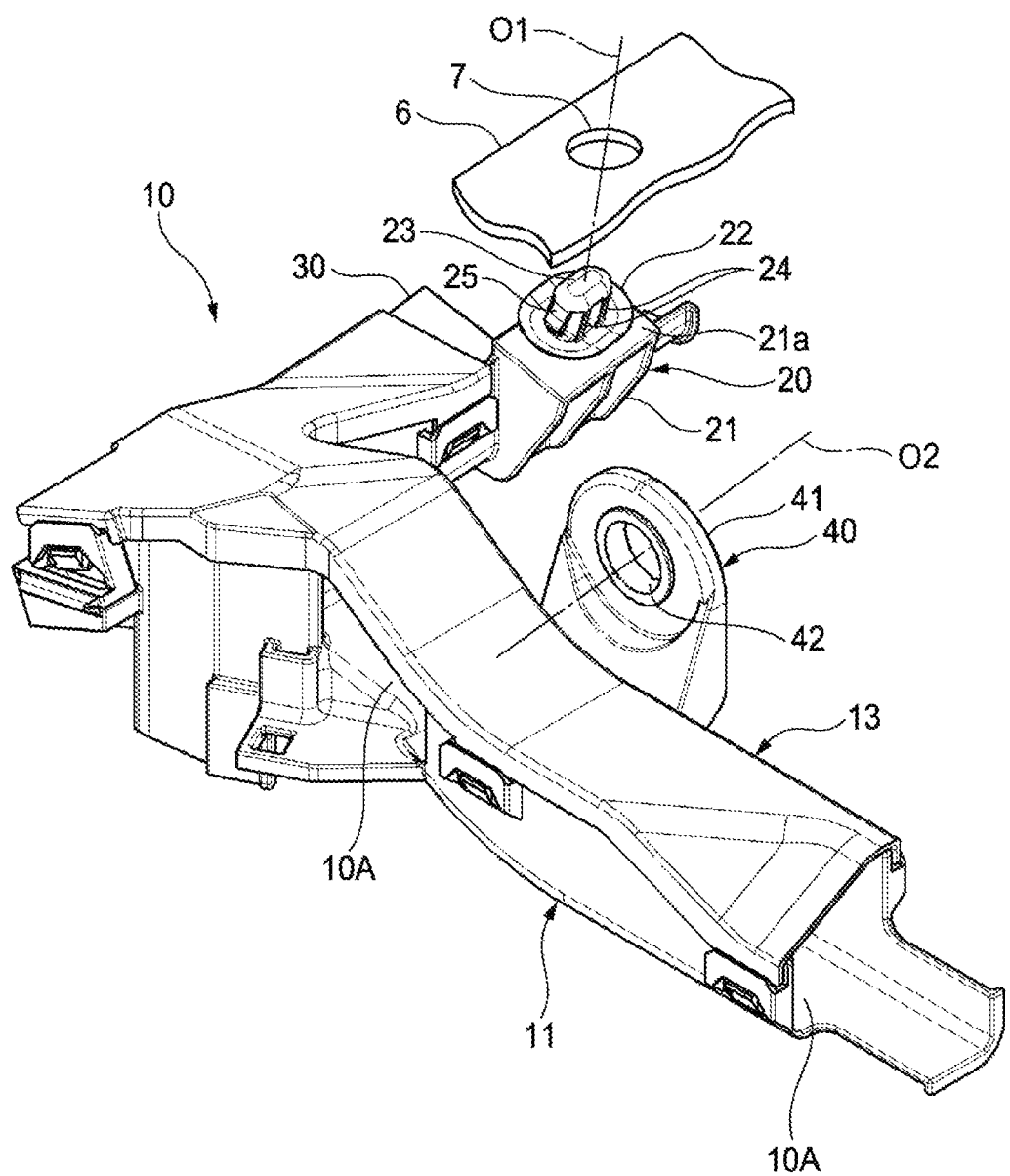
FIG. 3 is a perspective view of the protector according to the embodiment.
Figure 4:
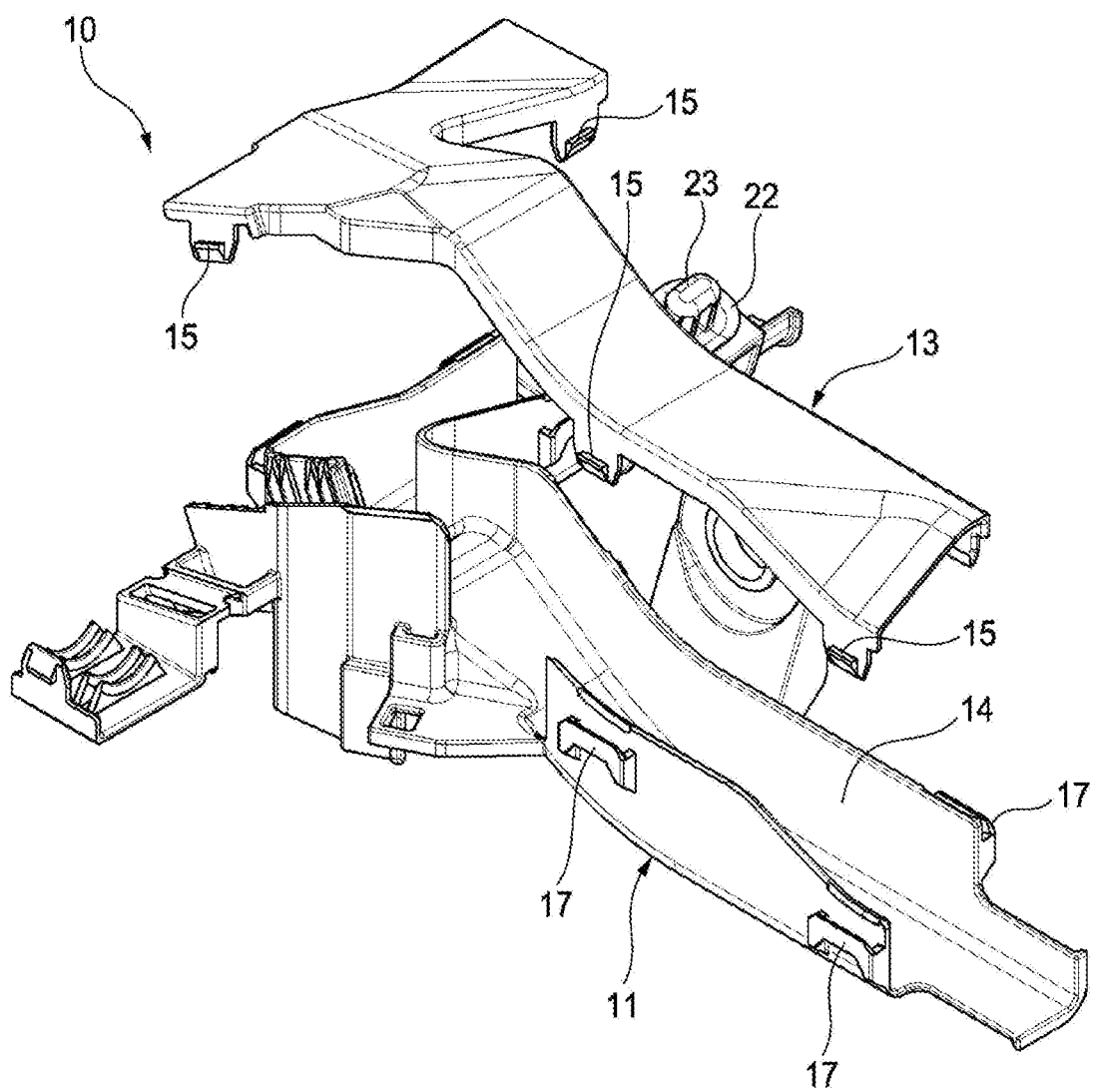
FIG. 4 is a perspective view of the protector in a state in which a cover part is removed from a main body part.
Figure 5:
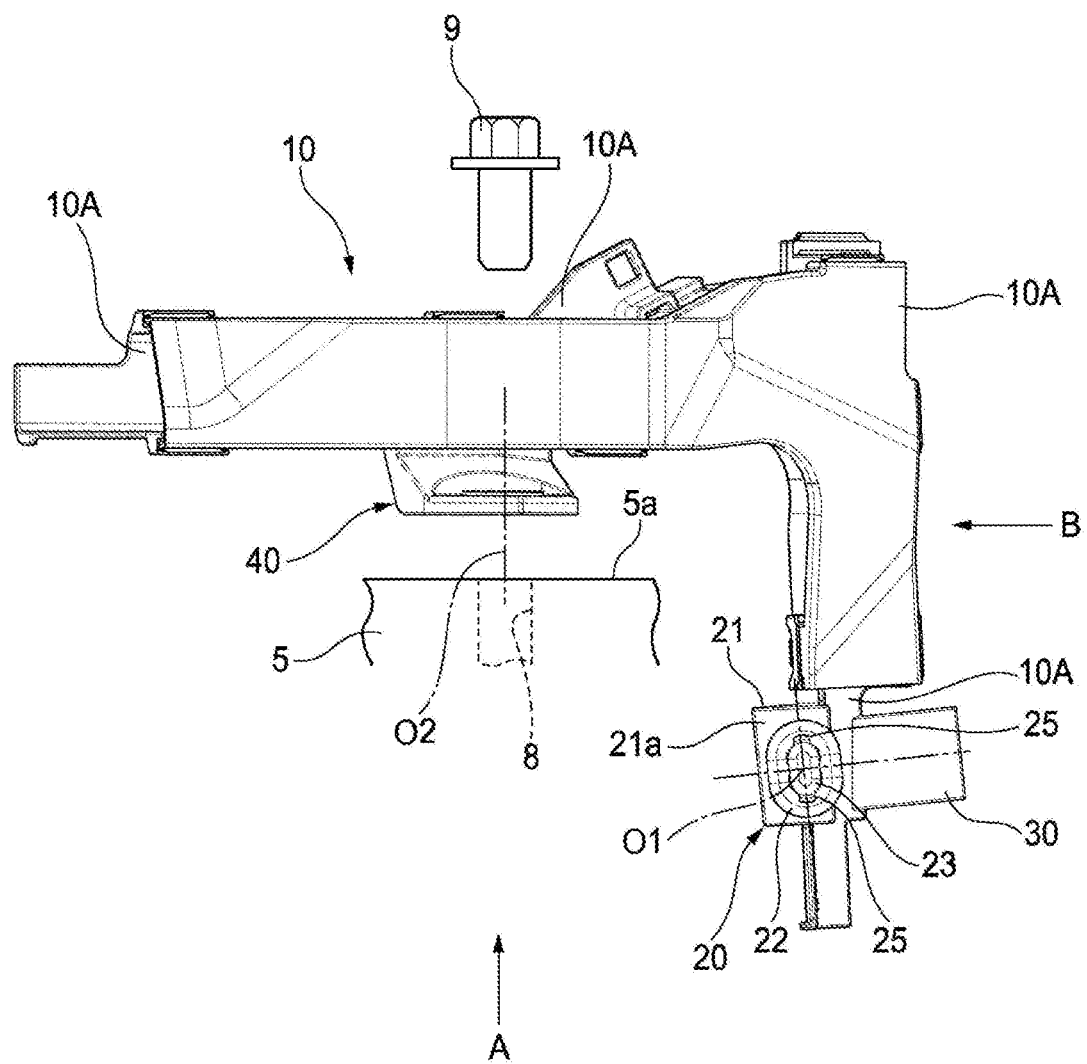
FIG. 5 is a plan view of the protector according to the embodiment.
Figure 6:
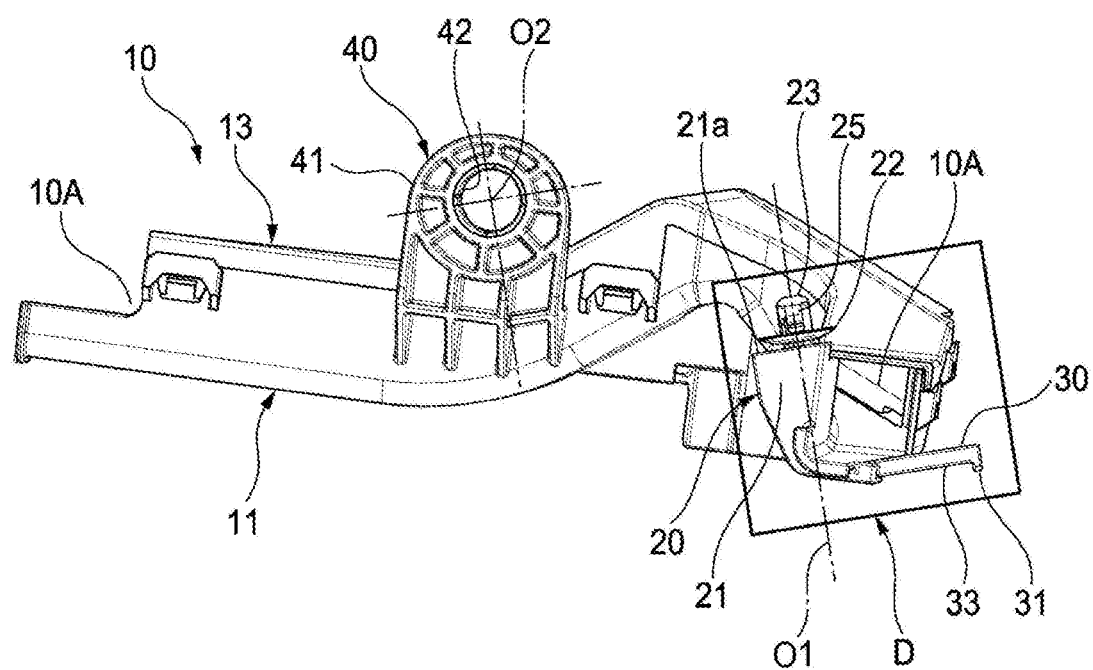
FIG. 6 is a view as illustrated in a direction of an arrow A of FIG. 5.
Figure 7:
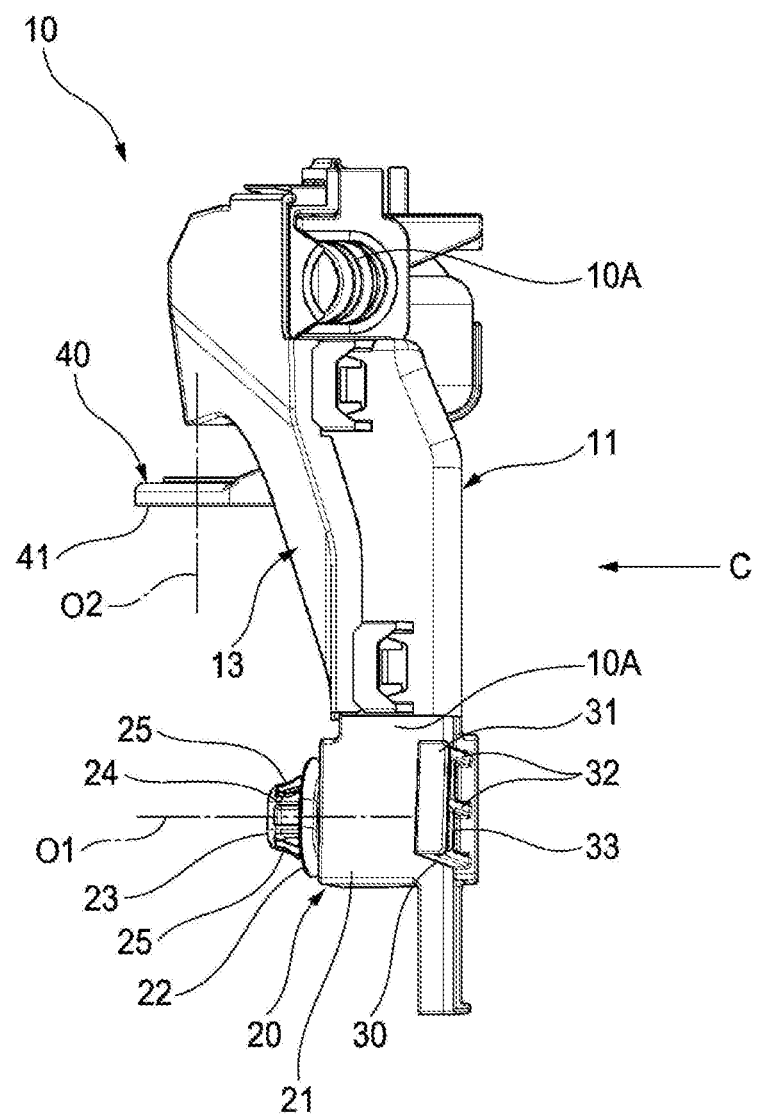
FIG. 7 is a view as illustrated in a direction of an arrow B of FIG. 5.
Figure 8:
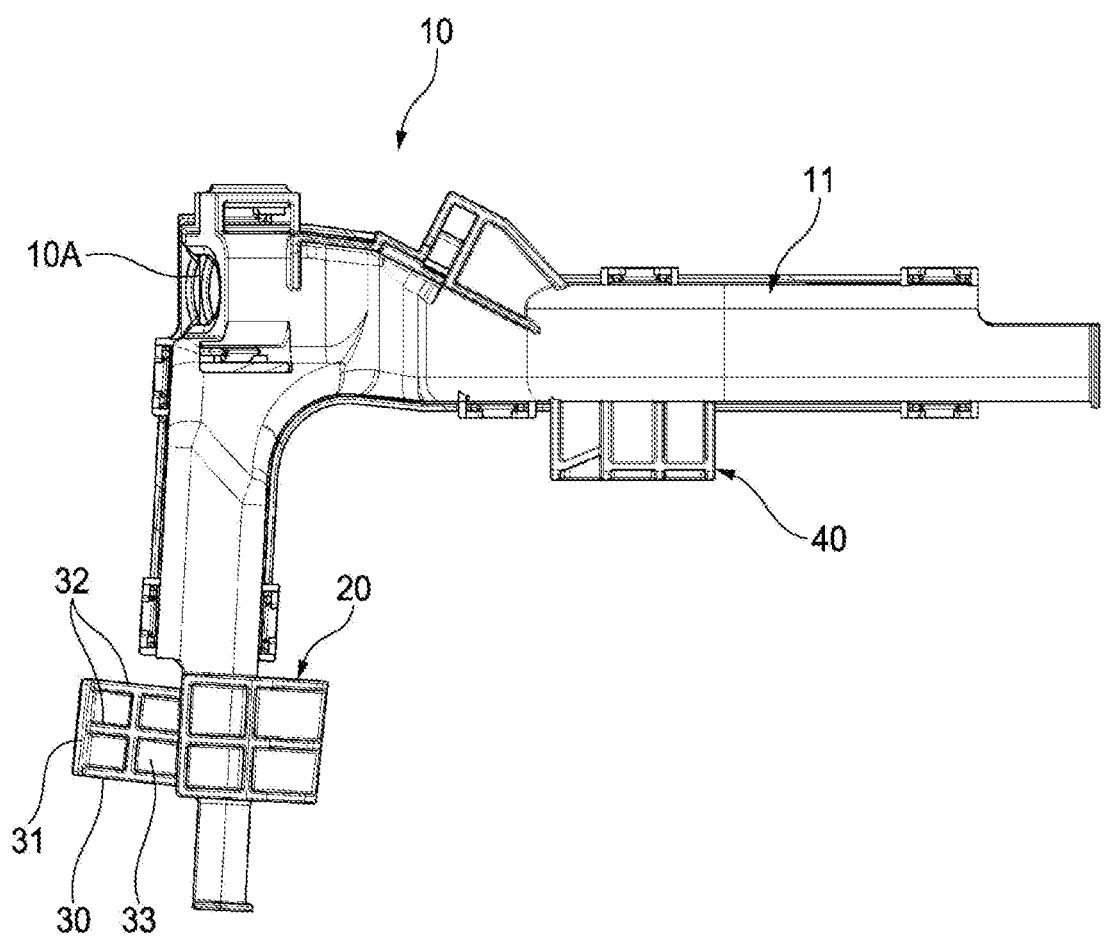
FIG. 8 is a view as illustrated in a direction of an arrow C of FIG. 7.

FIG. 3 is a perspective view of the protector according to the embodiment. FIG. 4 is a perspective view of the protector in a state in which a cover part is detached from a main body part. FIG. 5 is a plan view of the protector according to the embodiment. FIG. 6 is a view as illustrated in the direction of arrow A of FIG. 5. FIG. 7 is a view as viewed in the direction of the arrow B of FIG. 5. FIG. 8 is a view as viewed in the direction of arrow C of FIG. 7.

As illustrated in FIGS. 3 to 8, the protector 10 is provided with the main body part 11 and the cover part 13. The main body part 11 and the cover part 13 are made of a synthetic resin molded by injection molding or the like.

The main body part 11 is formed in a U-shaped cross section including an accommodation part 14 in which the electric wire bundle 1 constituting the wire harness 2 is accommodated. The cover part 13 is mounted so as to cover the opening side of the accommodation part 14 of the main body part 11 and closes the accommodation part 14 of the main body part 11. Claw parts 15 are formed on the edge portion of the cover part 13, and locking parts 17 capable of locking the claw parts 15 of the cover part 13 is formed on the side surface portion of the main body part 11. By covering the main body part 11 with the cover part 13 and locking the claw parts 15 to the locking parts 17, the cover part 13 is mounted on the main body part 11.

The protector 10 includes two fixing parts 20 and 40 fixed to the vehicle body 5. The fixing part 20 is fixed to a bracket 6 formed on the vehicle body 5, and the fixing part 40 is fixed to a mounting target surface 5a of the vehicle body 5 (see FIG. 1).

The fixing part 20 is provided at one of the wire lead-out parts 10A in the protector 10. The fixing part 20 includes a support part 21, an elastic plate 22, and a clamp 23. The support part 21 is formed integrally with one side portion of the main body part 11, and includes a fixing surface 21a opposed to the bracket 6 of the vehicle body 5. The elastic plate 22 and the clamp 23 are formed on the fixing surface 21a of the support part 21.

The elastic plate 22 is formed in a curved shape in which the bracket 6 side is recessed as viewed in a cross section. The clamp 23 is provided at the center of the elastic plate 22. The clamp 23 protrudes from the fixing surface 21a of the support part 21 so as to be perpendicular to the elastic plate 22. The clamp 23 includes support column parts 24, and a pair of locking claws 25 formed on both sides of the support column parts 24. The locking claws 25 are connected in the vicinity of the distal end of the support column parts 24 and are gradually separated from the support column parts 24 toward a base side of the support column parts 24.

A locking hole 7 is formed in the bracket 6 of the vehicle body 5 to which the fixing part 20 is fixed, and the fixing part 20 is locked in the locking hole 7 (see FIG. 3). Specifically, the clamp 23 of the fixing part 20 is inserted into the locking hole 7. Then, the locking claws 25 of the clamp 23 are temporarily constricted by the locking hole 7, and after that, the locking claws 25 are opened on the back surface side of the bracket 6. As a result, the respective locking claws 25 are locked on the back surface side of the bracket 6, and thus, the fixing part 20 locks the edge portion of the locking hole 7, and the protector 10 is fixed to the bracket 6. Further, in the fixed state, the elastic plate 22 is pressed by the bracket 6 and is elastically deformed. Therefore, the locking claws 25 of the clamp 23 reliably lock the edge portion of the locking hole 7 of the bracket 6 by the elastic force of the elastic plate 22.

Figure 9:
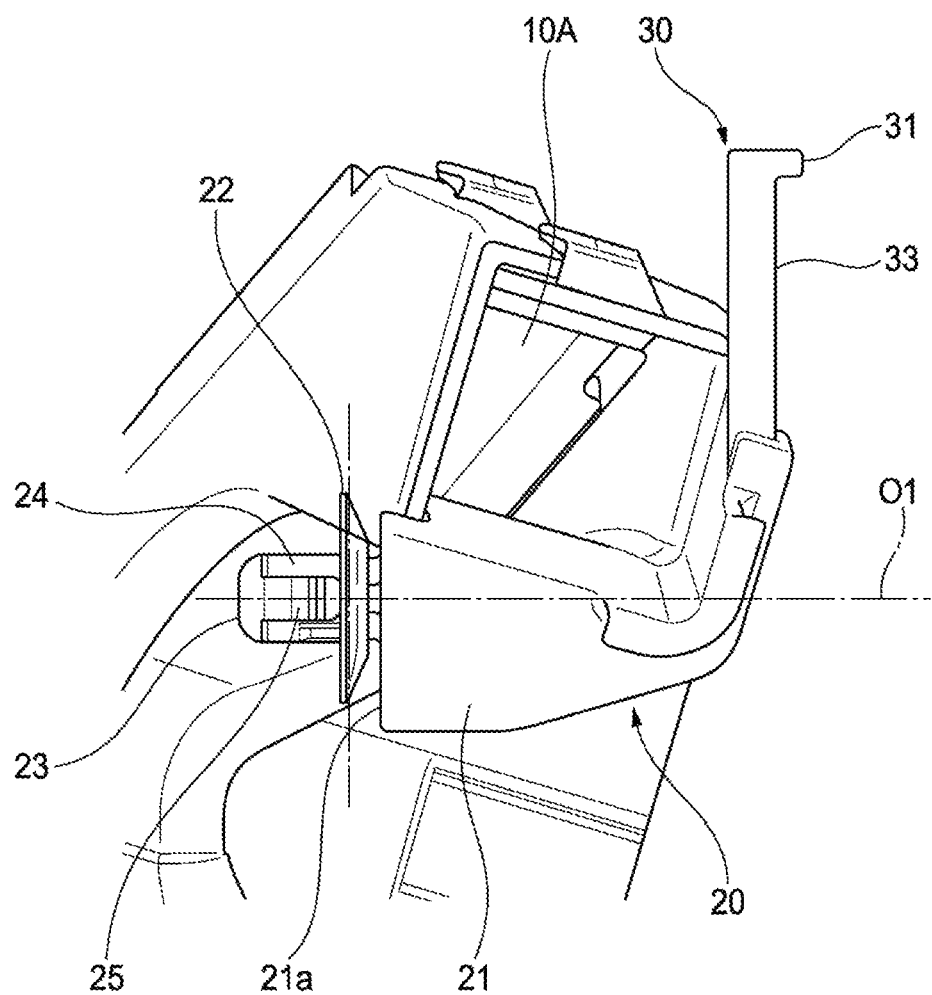
FIG. 9 is an enlarged view of a part D of FIG. 6.

FIG. 9 is an enlarged view of part D of FIG. 6.

As illustrated in FIG. 9, the fixing part 20 includes a pressing piece 30. The pressing piece 30 is formed on the side of the main body part 11 opposite to the clamp 23. The pressing piece 30 is formed in a plate shape. The pressing piece 30 extends in a direction intersecting with an axis O1 of the clamp 23 and is disposed at a position laterally deviating from the axis O1 of the clamp 23. The pressing piece 30 is arranged in parallel along a plane perpendicular to the axis O1 of the clamp 23.

On the pressing piece 30, a locking protrusion 31 is formed on the edge portion on the distal end side thereof. The locking protrusion 31 is formed on the back surface side on the side opposite to the clamp 23. In addition, in the pressing piece 30, a grid-like reinforcing rib 32 is formed on the back surface side thereof. In the pressing piece 30, the back surface on which the reinforcing rib 32 is formed is a pressing surface 33 for pressing by a finger of an operator when engaged by inserting the clamp 23 to the locking hole 7. The pressing surface 33 has an area capable of sufficiently applying a pressing force when the operator pushes the clamp 23 into the locking hole 7 by being pushed by a finger.

The pressing surface 33 is formed, for example, in a rectangular shape with each side of about 20 mm.

The pressing piece 30 is disposed so as to cover a part of the periphery of the electric wire bundle 1 drawn out from the electric wire lead-out part 10A of the protector 10. Thus, a part of the electric wire bundle 1 drawn out from the electric wire lead-out part 10A is held by the pressing piece 30 and is guided in the lead-out direction.

The fixing part 40 includes a fixing plate part 41. A mounting hole 42 is formed in the fixing plate part 41. A bolt 9 to be screwed into the bolt hole 8 formed in the mounting surface 5a of the vehicle body 5 is inserted through the mounting hole 42 (see FIG. 5). The mounting hole 42 formed in the fixing plate part 41 of the fixing part 40 has its axis O2 in a direction perpendicular to the axis O1 of the clamp 23 of the fixing part 20. As a result, the axis O1 of the clamp 23 of the fixing part 20 is arranged around the axis of the mounting hole 42. In this fixing part 40, the fixing plate part 41 of the fixing part 40 is fastened and fixed to the mounting target surface 5a of the vehicle body 5 by screwing the bolt 9 passed through the mounting hole 42 into the bolt hole 8 of the vehicle body 5. Thus, the protector 10 is also fixed to the vehicle body 5 in the fixing part 40.

Next, an example of a procedure for securing the protector 10 having the above-described structure to the vehicle body 5 so as to arrange the wire harness 2 on the vehicle body 5 will be described.

First, the protector 10 is arranged at the fixing part of the vehicle body 5. As a result, the clamp 23 of the fixing part 20 is disposed at a position facing the locking hole 7 of the bracket 6 of the vehicle body 5, and the fixing part 40 is arranged on the mounting target surface 5a of the vehicle body 5.

The bolt 9 is inserted into the mounting hole 42 of the fixing plate part 41 of the fixing part 40 and screwed into the bolt hole 8 of the vehicle body 5. At this time, the bolt 9 is not completely screwed into the bolt hole 8, and temporarily fixes the fixing part 40 to the vehicle body 5.

By pressing the pressing surface 33 of the pressing piece 30 of the fixing part 20 with a finger, the clamp 23 of the fixing part 20 is inserted into the locking hole 7 of the bracket 6, and the locking claws 25 of the clamp 23 are locked to the edge portion of the locking hole 7. As a result, the fixing part 20 of the protector 10 is fixed to the bracket 6 of the vehicle body 5.

Figure 10:
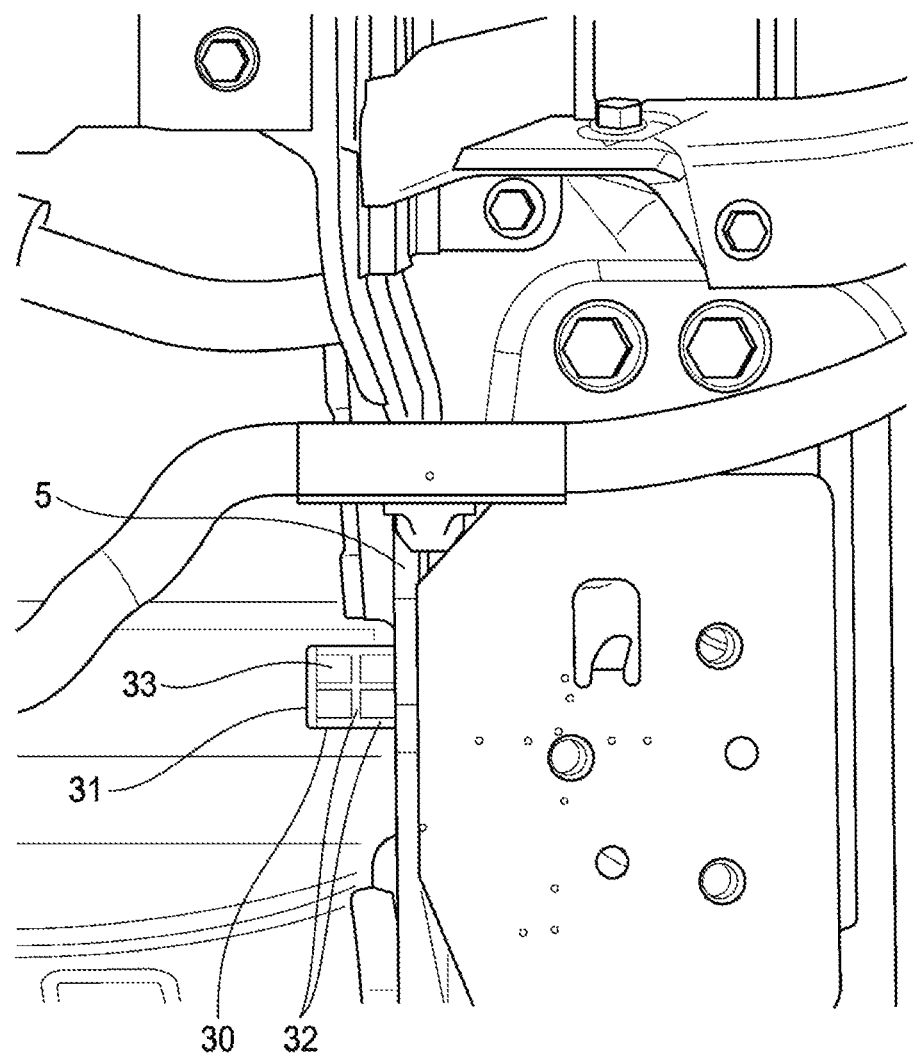
FIG. 10 is a view as illustrated in a direction of an arrow E of FIG. 1.

At this time, if a part of the vehicle body 5 is disposed on the opposite side of the clamp 23 of the fixing part 20 of the protector 10, there may be cases where the vehicle body 5 becomes an obstacle and a space into the finger is input on the opposite side of the clamp 23 of the fixing part 20 of the protector 10 can be secured. The protector 10 according to the embodiment includes the pressing piece 30 which extends in a direction intersecting with the axis O1 of the clamp 23 and is disposed at a position laterally deviated from the axis O1 of the clamp 23. Therefore, even if it is not possible to secure the space for putting a finger on the side opposite to the clamp 23 of the fixing part 20 of the protector 10, as illustrated in FIG. 10, the operator can press the pressing piece 30 projecting to the side of the vehicle body 5 with a finger to push the clamp 23 into the locking hole 7.

Further, when pressing the pressing piece 30, the protector 10 is rotated about the provisionally fixed location provided by the bolt 9 of the fixing part 40 as a fulcrum. Therefore, it is possible to smoothly and easily perform the assembling work of inserting and locking the clamp 23 into the locking hole 7 with a small force.

When the fixing part 20 is fixed to the bracket 6, the bolt 9 is screwed into the bolt hole 8 and tightened to fix the fixing plate part 41 of the fixing part 40 to the mounting target surface 5a of the vehicle body 5.

According to the procedure described above, the protector 10 is fixed to the vehicle body 5, and the wire harness 2 in which the protector 10 is assembled to the electric wire bundle 1 is disposed on the vehicle body 5.

As described above, according to the protector 10 of the embodiment, on the side in the main body part 11 opposite to the clamp 23, the pressing piece 30, which extends along the plane perpendicular to the axis O1 of the clamp 23 and is disposed at a position laterally deviating from the axis O1 of the clamp 23, is formed. Therefore, the pressing piece 30 is pushed at a position laterally deviating from the axis O1 of the clamp 23, and the clamp 23 can be pushed into and locked to the locking hole 7 formed in the bracket 6 of the vehicle body 5 which is the mounting part. Therefore, even when assembling the clamp 23 to the bracket 6 of the vehicle body 5, even in the case of assembling the clamp 23 to the narrow installation space in which it is not possible to secure the space for putting the finger on the side opposite thereof, it is possible to lock the clamp 23 to the locking hole 7 and easily assemble the clamp 23 to the bracket 6 of the vehicle body 5.

Further, the axis O1 of the clamp 23 is arranged around the axis of the mounting hole 42 formed in the fixing plate part 41 of the fixed portion 40. Therefore, by pressing the pressing piece 30 temporarily fixed to the vehicle body 5 by the bolt 9 inserted into the mounting hole 42 of the fixing plate part 41, the clamp 23 can be easily inserted and locked to the locking hole 7 with the provisionally fixed portion provided by the bolt 9 as a fulcrum. As a result, it is possible to reduce the pressing force required when pushing the clamp 23 into the locking hole 7, and it is possible to improve the assembling workability.

In addition, the pressing piece 30 is disposed in parallel with a plane perpendicular to the axis O1 of the clamp 23. Therefore, the pressing force when the pressing piece 30 is pressed can be stably applied to the clamp 23, and the clamp 23 can be smoothly pushed into the locking hole 7 and locked thereto.

In the above embodiment, the fixing plate part 41 is fastened by inserting the bolt 9 into the mounting hole 42 of the fixing plate part 41 of the fixing part 40 and by screwing the bolt into the bolt hole 8 of the vehicle body 5, but the fixed structure of the fixing part 40 is not limited to the above example. For example, by inserting a stud bolt standing on the vehicle body 5 into the mounting hole 42 of the fixing plate part 41 of the fixing part 40, and by screwing a nut onto the stud bolt, the fixing plate part 41 of the fixing part 40 may be fastened and fixed to the vehicle body 5.

It is to be noted that the invention is not limited to the above-described embodiment, but can be appropriated, modified, improved, and the like. In addition, materials, shapes, dimensions, numbers, placement locations, and the like of the constituent elements in the above-described embodiment are arbitrary as far as the invention can be achieved, and are not limited.

Figure 11:
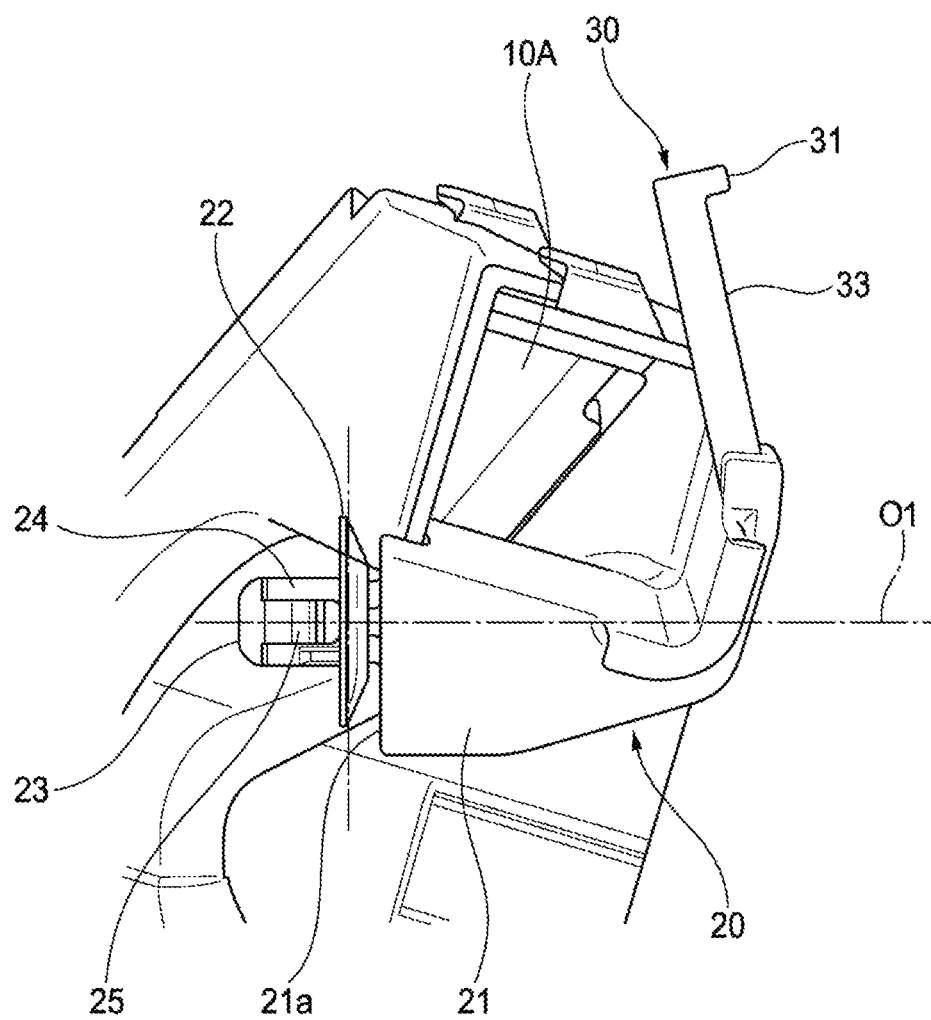
FIG. 11 is an enlarged view of a part D of FIG. 6 illustrating a modified example.

For example, as illustrated in FIG. 11, the pressing piece 30 may be inclined toward the clamp 23 as it is farther from the axis O1 of the clamp 23 with respect to a plane perpendicular to the axis O1 of the clamp 23. In this case, it is possible to enlarge the space of the pressing piece 30 on the side opposite to the clamp 23, and to improve the assembling workability.

Figure 12:
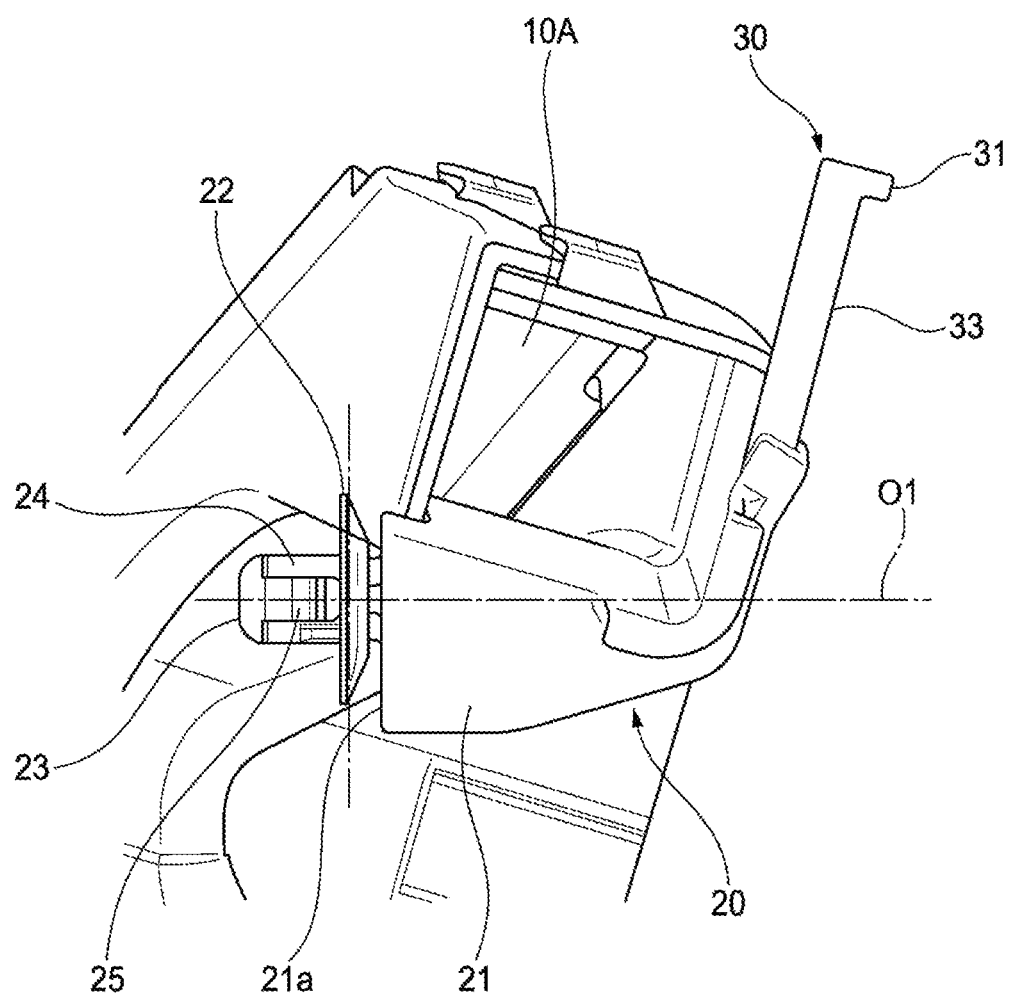
FIG. 12 is an enlarged view of a part D of FIG. 6 illustrating a modified example.
Figure 13:
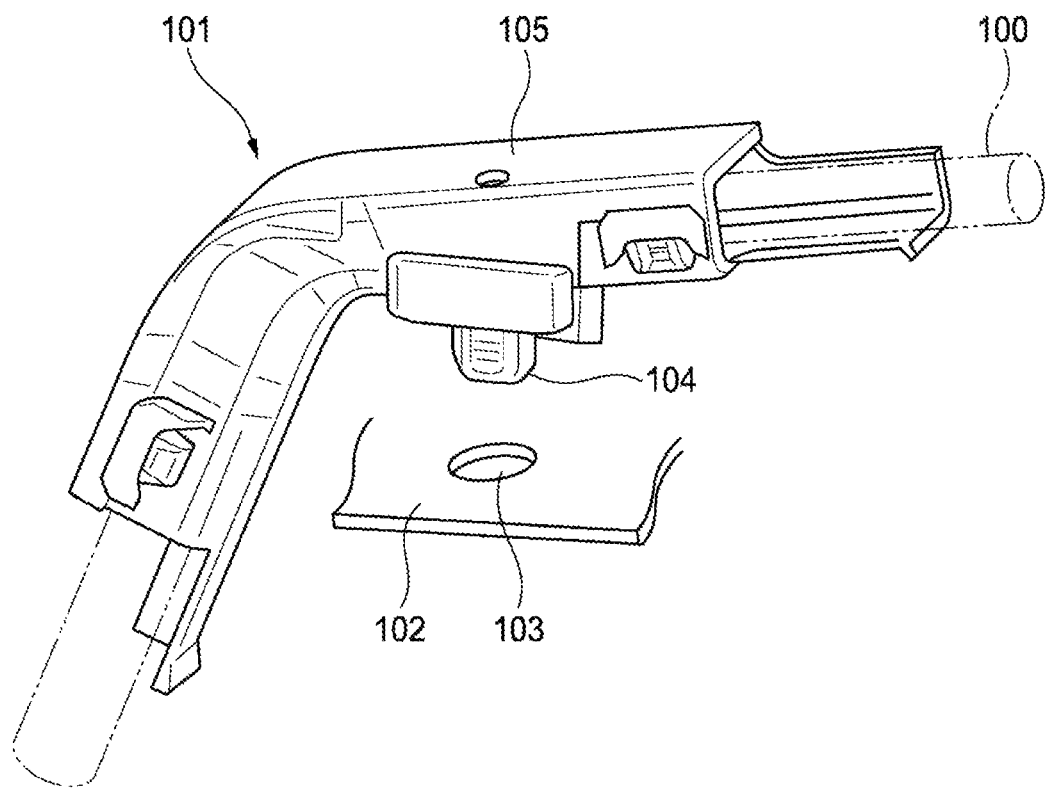
FIG. 13 is a perspective view of a protector of a structure of the related art.

Further, as illustrated in FIG. 12, the pressing piece 30 may be inclined toward the side opposite to the clamp 23 as it is farther from the axis O1 of the clamp 23 with respect to the plane perpendicular to the axis O1 of the clamp 23. By doing so, it is possible to improve the catching of the finger when pressing the pressing piece 30, and to press the clamp 23 with a stronger force and to surely push and lock the pressing piece 30 into the locking hole 7.

Here, the features of the embodiment of the protector according to the invention described above are summarized briefly in the following [1] to [5], respectively.

[1] A protector including:
a main body part (11) including an accommodation part (14) which accommodates an electric wire bundle (1);
a cover part (13) which is attached to the main body part (11) and covers the accommodation part (14);
a clamp (23) which is formed on the main body part (11) and is inserted into a locking hole (7) formed in a mounting target part (a vehicle body 5, and a bracket 6) to lock the mounting target part (the bracket 6); and
a pressing piece (30) which is formed on a side of the main body part (11) opposite to the clamp (23), extends along a plane perpendicular to an axis (O1) of the clamp (23), and is disposed at a position laterally deviating from the axis (O1) of the clamp (23).

[2] The protector according to [1],
wherein the main body part (11) has a mounting hole (42) and includes a fixing plate part (41) fastened to the mounting target part (the vehicle body 5) by a bolt (9) inserted into the mounting hole (42), and
wherein the axis (O1) of the clamp (23) is arranged around the axis of the mounting hole (42).

[3] The protector according to [1] or [2],
wherein the pressing piece (30) is arranged in parallel with the plane perpendicular to the axis (O1) of the clamp (23).

[4] The protector according to [1] or [2],
wherein the pressing piece (30) is inclined toward the clamp (23) as it is farther from the axis (O1) of the clamp (23) with respect to the plane perpendicular to the axis (O1) of the clamp (23).

[5] The protector according to [1] or [2],
wherein the pressing piece (30) is inclined toward a side opposite to the clamp (23) as it is farther from the axis (O1) of the clamp (23) with respect to the plane perpendicular to the axis (O1) of the clamp (23).

The invention claimed is:

1. A protector comprising:
a main body part comprising an accommodation part which accommodates an electric wire bundle;
a cover part which is attached to the main body part and covers the accommodation part;
a clamp which is formed on the main body part and is configured to be inserted, along an axis of the clamp, into a locking hole formed in a mounting target part to lock the mounting target part, the clamp being configured to move along a rotational direction when being inserted into the locking hole; and
a pressing piece which is formed on a side of the main body part opposite to the clamp, extends along a plane perpendicular to the axis of the clamp, and is disposed at a position laterally deviating from the axis of the clamp, wherein
the main body part comprises a fixing plate part that includes a mounting hole, the fixing plate part configured to be fastened to the mounting target part via the mounting hole, and
the pressing piece, when pressed when the fixing plate part is at least provisionally fixed to the mounting target part via the mounting hole, is configured to cause the main body part to pivot around an axis extending through the mounting hole, such that the clamp is inserted into the locking hole of the mounting target part, the main body part being configured to move along the rotational direction when pivoting around the axis extending through the mounting hole.

2. The protector according to claim 1,
wherein the fixing plate part is configured to be fastened to the mounting target part by a bolt inserted into the mounting hole along the axis extending through the mounting hole, and
wherein the axis of the clamp is perpendicular to the axis of the mounting hole.

3. The protector according to claim 1,
wherein the pressing piece extends in a direction parallel with the plane perpendicular to the axis of the clamp.

4. The protector according to claim 1,
wherein the pressing piece is inclined toward an extension direction of the clamp such that the pressing piece extends farther from the plane perpendicular to the axis of the clamp, as the pressing piece extends farther away from the axis of the clamp.

5. The protector according to claim 4,
wherein the pressing piece has a plate shape that is flat, and the plate shape is inclined toward the extension direction of the clamp such that the plate shape extends farther from the plane perpendicular to the axis of the clamp, as the plate shape extends farther away from the axis of the clamp.

6. The protector according to claim 1,
wherein the pressing piece is inclined toward a side opposite to an extension direction of the clamp such that the pressing piece extends farther from the plane perpendicular to the axis of the clamp, as the pressing piece extends farther away from the axis of the clamp.

7. The protector according to claim 6,
wherein the pressing piece has a plate shape that is flat, and the plate shape is inclined toward the side opposite to the extension direction of the clamp such that the plate shape extends farther from the plane perpendicular to the axis of the clamp, as the plate shape extends farther away from the axis of the clamp.

8. The protector according to claim 1,
wherein the pressing piece has a surface, on a side of the pressing piece opposite to an extension direction of the clamp, that is exposed from the main body part and configured to be pressed so as to cause the main body part to pivot around the axis extending through the mounting hole, such that the clamp is inserted into the locking hole of the mounting target part.

9. A protector system comprising:
a mounting target part;
a main body part comprising an accommodation part which accommodates an electric wire bundle;
a cover part which is attached to the main body part and covers the accommodation part;
a clamp which is formed on the main body part and is configured to be inserted, along an axis of the clamp, into a locking hole formed in the mounting target part to lock the mounting target part, the clamp being configured to move along a rotational direction when being inserted into the locking hole; and
a pressing piece which is formed on a side of the main body part opposite to the clamp, extends along a plane perpendicular to the axis of the clamp, and is disposed at a position laterally deviating from the axis of the clamp, wherein the main body part comprises a fixing plate part that includes a mounting hole, the fixing plate part configured to be fastened to the mounting target part via the mounting hole, and the pressing piece, when pressed when the fixing plate part is at least provisionally fixed to the mounting target part via the mounting hole, is configured to cause the main body part to pivot around an axis extending through the mounting hole, such that the clamp is inserted into the locking hole of the mounting target part, the main body part being configured to move along the rotational direction when pivoting around the axis extending through the mounting hole.

* * * * *